United States Patent

Hanchett

[15] 3,671,778

[45] June 20, 1972

[54] SWITCHING CIRCUITS

[72] Inventor: George D. Hanchett, Summit, N.J.

[73] Assignee: RCA Corporation, New York, N.Y.

[22] Filed: Sept. 11, 1970

[21] Appl. No.: 71,389

Related U.S. Application Data

[63] Continuation of Ser. No. 590,320, Oct. 28, 1966, abandoned.

[52] U.S. Cl. ........................307/252 B, 307/305, 307/252 J, 307/253, 307/246

[51] Int. Cl. ........................H03k 17/00

[58] Field of Search ....................307/252.21, 206, 284, 305, 307/305 A

[56] References Cited

UNITED STATES PATENTS

| | | | |
|---|---|---|---|
| 2,816,238 | 12/1957 | Elliott | 307/249 |
| 3,346,744 | 10/1967 | Howell | 307/305 X |
| 3,346,874 | 10/1967 | Howell | 307/305 X |
| 3,348,128 | 10/1967 | Storm | 307/305 X |
| 3,446,991 | 5/1969 | Howell | 307/252 |

*Primary Examiner*—Donald D. Forrer
*Assistant Examiner*—R. C. Woodbridge
*Attorney*—Edward J. Norton

[57] ABSTRACT

A bidirectional gate controlled device, such as a triac, is connected in circuit with a time constant circuit, an AC source, and a load. The time constant circuit is adapted to charge only when the AC source is of a given polarity; its discharge duration being sufficient to provide a triggering signal to the gate of the device to trigger it into consecutive conduction in both of its conducting directions.

13 Claims, 6 Drawing Figures

Inventor:
GEORGE D. HANCHETT

By Edward J. Norton
Attorney

SWITCHING CIRCUITS

This is a continuation of my copending application Ser. No. 590,320, filed October 28, 1966 and now abandoned.

This invention relates generally to switching circuits and more particularly to an improved switching circuit which substantially avoids the generation thereby of undesirable switching transients and the interference associated therewith.

A common fault of switching circuits as previously known is the substantial switching transients which result from the operation of the circuits. Such transients are often the cause of annoying interference in nearby audio and video receivers. A further disadvantage of prior art switching circuits is the amount of operational power necessary to switch the circuit.

Accordingly it is an object of this invention to provide an improved switching circuit which substantially avoids the generation thereby of switching transients and the interference associated therewith.

A further object of the present invention is to provide an improved switching circuit which requires small amounts of power for its control relative to the amount of power that is being switched.

In accordance with one embodiment of this invention, the terminal electrodes of a controlled bi-directional switching device, such as a Triac, are connected in series with a load across a pair of terminals to which a source of alternating current (a.c.) can be connected. A time constant circuit for triggering the control electrode of the Triac is also connected across the a.c. terminals. The time constant circuit is designed to charge initially during a given half cycle of the alternating current. Thereafter the circuit discharges through the control electrode of the Triac, triggering the Triac into a conductive state at, or very near, the beginning of the next half cycle of the alternating current. The time constant circuit is further designed such that the duration of discharge through the control electrode is long enough to cause the Triac to become conductive in the opposite direction during the beginning of the next cycle of the alternating current when the polarity of the voltage across the terminal electrodes of the Triac reverses.

The operation of the circuit is such that the Triac remains nonconductive during an initial half cycle of the a.c. source while the time constant circuit is charging, and becomes conductive in alternate directions during successive half cycles of the a.c. supply at instances when the absolute magnitude of the voltage across its terminal electrodes is quite low. As a result thereof the transients caused by the switching of the circuit are minimal and interference with nearby audio and video receivers are minimized.

Furthermore, as a result of the low power loss characteristics of modern switching devices used in the circuit of the present invention, a small amount of power is required to control significantly larger amounts of power.

The present invention will be more fully understood when the following description is read in conjunction with the accompanying figures wherein like reference numerals indicate like elements and in which.

Before proceeding further with a detailed explanation of the operation of the embodiments of the present invention represented by FIGS. 1 through 5 it would perhaps be advisable to set forth a cursory description of the nature of the operation of the semiconductor element used in these embodiments and referred to therein as a Triac.

Triac is a generic term which has been coined to identify the A.C. semiconductor switch equivalent of the triode.

As a semiconductor device the Triac operates in a manner similar to the Silicon Control Rectifier (SCR). Both are triggered into conduction upon the application of a signal to its control or "gate" electrode when a given potential difference exits across the terminal electrodes of the device, and remain in a conductive state until the potential across their terminal electrodes drop below a predetermined value. The significant distinction between the Triac and the SCR rests in the fact that the Triac is capable of conducting current in two directions while the SCR is capable of conducting current in only one direction.

Figures 5, 6:
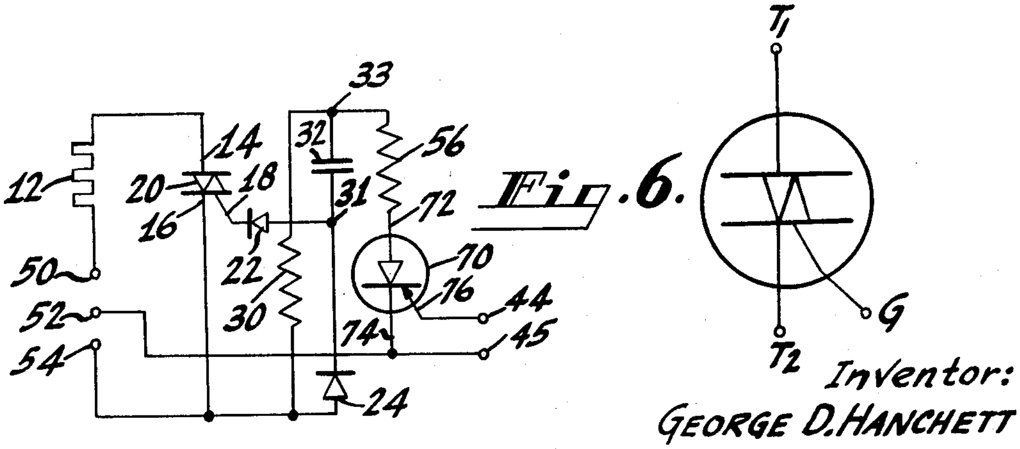
FIG. 6 is a circuit representation of a Triac, as used in this application.

FIG. 6 represents the circuit symbol for the Triac. When the potential difference across terminals $T_1$ and $T_2$ is such that $T_1$ is positive with respect to $T_2$, the application of a signal to the control electrode G, of either positive or negative polarity with respect to $T_2$, will switch the device into a conducting state such that conventional current will flow from $T_1$ to $T_2$. Furthermore, when the potential difference across terminals $T_1$ and $T_2$ is such that $T_1$ is negative with respect to $T_2$ the application of either a positive or negative signal to the control electrode G will cause the device to switch into a conducting state such that conventional current flows from $T_2$ to $T_1$. Wherefrom it can be seen that the Triac is capable of operating, with varying degrees of sensitivity, in any one of the following modes (all polarities are taken with $T_2$ as the point of reference potential):

| $T_1$ | G |
|---|---|
| Positive | Positive |
| Positive | Negative |
| Negative | Positive |
| Negative | Negative |

Figure 1:
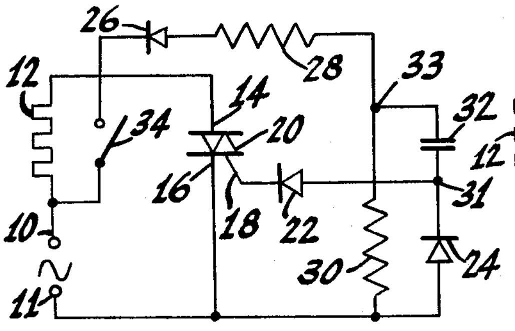
FIG. 1 is a circuit diagram representing one embodiment of a circuit employing the present invention.

Turning now to the embodiment of the present invention as represented in FIG. 1, one terminal 10 of an alternating current supply is connected to one terminal of a load 12. This load, for example, may be the heater portion of an electric blanket or electric cooking device, or it might be a space heater of motor load. The first terminal electrode 14 of a Triac 20 is connected to the other terminal of the load 12. The second terminal electrode 16 of the Triac 20 is connected to the second terminal 11 of the a.c. source. A first diode 22 and a second diode 24 are connected in series between the control electrode 18 of the Triac 20 and the input terminal 11. Both diode 22 and diode 24 are poled to conduct conventional current toward the control electrode 18 of the Triac 20. A third diode 26, a first resistor 28, and a second resistor 30, are connected in series in the order named, between terminal 10 and terminal 11 of the a.c. source, the diode 26 being poled to conduct conventional current toward terminal 10. A capacitor 32 is connected between the junction 31 of diode 22 and diode 24, and the junction 33 of resistor 28 and resistor 30. A switch 34 is connected to prevent current flow, when open, through the series circuit including the diode 26 and the resistor 28. As shown in FIG. 1 the switch 34 may be connected between the diode 26, and the input terminal 10.

Referring now to the operation of the circuit described in FIG. 1, when the switch 34 is open the circuit is rendered nonconductive. This condition results from the fact that with the switch open the time constant circuit, comprising elements 28, 30, and 32, is unable to charge and without so doing cannot trigger the control electrode 18 of the Triac 20. Since the Triac 20 remains nonconductive in the absence of a signal applied to its control electrode 18, there is no completed path in the circuit through which current can flow.

When the switch 34 is closed and the potential at terminal 10 becomes negative with respect to terminal 11, the diodes 24 and 26 become forward biased and switch into their conductive states. Conventional current then flows from terminal 11 through the portion of the circuit including resistor 30 in parallel with the series combination of diode 24 and capacitor 32, through resistor 28, diode 26, the switch 34, and terminal 10. No noticeable transients occur as a result of the closing of switch 34 because of the small amount of current flowing in the circuit. The Triac 20 remains in a nonconductive state as a result of the reverse bias across diode 22 which serves to prevent the diode from switching into its conductive state and therefore isolates the control electrode 18 from the charging capacitor 32.

During the initial period of the operation of the circuit as described, capacitor 32 charges to a value which is limited by the voltage divider action of resistors 28 and 30, with junction 31 being positive with respect to junction 33. At some point during the half cycle of the a.c. source when terminal 10 is negative with respect to terminal 11, the potential at terminal 10 will become less negative than the negative side 33 of capacitor 32 and the potential at junction 31 will become more positive than the potential at terminal 11 causing diodes 24 and 26 to become reversed biased and switch into their nonconductive states. Capacitor 32 will then begin to discharge through diode 22 which is now forward biased and in a conducting state. If the ratio of the value of resistor 28 to that of resistor 30 is relatively high, the point at which the capacitor 32 will begin to discharge will be very near the end of the charging half-cycle, i.e., when the potential across the terminals 10 and 11 is approaching zero. The capacitor 32 will continue to discharge through the control electrode 18 as the a.c. source polarity reverses, i.e., terminal 10 becomes positive with respect to terminal 11, and the discharge signal to the control electrode 18 will trigger the Triac 20 into a conductive condition causing it to conduct conventional current from terminal 10, through the load 12, the Triac 20, and terminal 11. The Triac 20 will continue to so conduct until the potential across terminals 10 and 11 decreases to the point where it is approaching zero at which time the Triac 20 will be switched into its nonconducting state. Furthermore, if the value of the capacitor 32 is properly selected, the duration of the discharge period can be made sufficiently long so that when the polarity of the alternating current across terminals 10 and 11 reverses again, i.e., terminal 10 becomes negative with respect to terminal 11, there remains sufficient discharge current at the control electrode 18 from the capacitor 32 to trigger the Triac 20 into a conducting condition in the opposite direction causing it to conduct conventional current from terminal 11, through the Triac 20, the load 12, and terminal 10. The foregoing operations are continued and repeated during successive cycles of the a.c. supply, the only difference being that successive charging of the capacitor 32 takes place while the Triac 20 is already in a conducting state.

To discontinue operation of the circuit it is merely necessary to open the switch 34. Thereafter the time constant circuit is prevented from charging capacitor 32 and the control electrode 18 receives no triggering signal thereby preventing the Triac 20 from becoming conductive in either direction.

Figure 2:
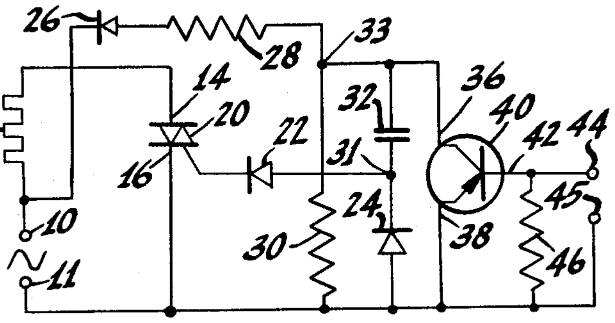
FIGS. 2 through 5 are circuit diagrams of further embodiments of the invention.

In FIG. 2 the switch 34 has been removed and, in its stead, the collector 36 to emitter 38 path of a PNP transistor 40 is connected between junction 33 and terminal 11 in the order mentioned. The base 42 of the transistor 40 is connected to its emitter 38 through a resistor 46. Except for the manner in which the capacitor 32 is charged, the operation of the circuit of FIG. 2 is identical to the operation of the circuit of FIG. 1. As long as the transistor 40 is in a conductive state it serves as a by-pass around the charging capacitor 32. To charge the capacitor 32 it is merely necessary to cut off an input signal to the base 42 to emitter 38 circuit by varying a signal applied from a suitable source (not shown) to the input terminals 44 and 45 of the transistor 40. Once the transistor 40 becomes nonconductive the circuit operates as in FIG. 1. Thereafter, to shut off the circuit, the transistor 40 need merely be made conductive again. This is accomplished by applying a small signal to the input terminals 44 and 45 of the transistor. In this manner a very small signal, in the order of a few microwatts, is capable of controlling a relatively large amount of power in the order of kilowatts, applied to the load 12.

Figure 3:
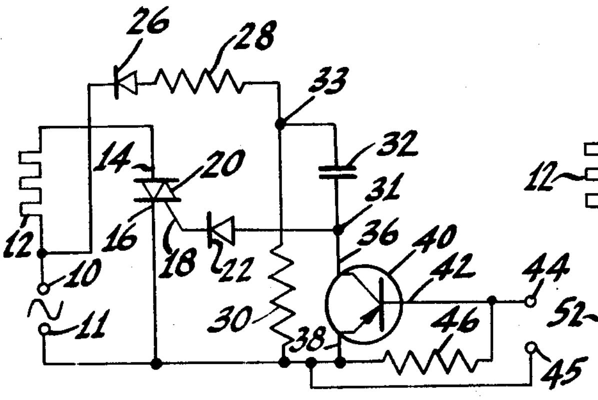

In the embodiment of the present invention represented by FIG. 3, the collector 36 to emitter 38 path of a PNP transistor 40 is connected between junction 31 and terminal 11. The diode 24 of FIGS. 1 and 2 is removed. A resistor 46 is placed across the base 42 to emitter 38 terminals of the transistor 40 and these terminals 42 and 38 are brought out to input terminals 44 and 45 to which a signal source (not shown) may be connected.

In the described circuit of FIG. 3 the transistor 40 is a necessary element of the charging circuit. If no signal is applied across terminals 44 and 45, the transistor 40 remains non-conductive and the capacitor 32 cannot charge. Upon the application of a signal to the terminals 44 and 45, the transistor 40 is rendered conductive thereby completing the charging circuit from terminal 11 through the portion of the circuit including resistor 30 in parallel with the series combination of transistor 40 and capacitor 32, through resistor 28, diode 26 and terminal 10. Thereafter, so long as the transistor 40 remains conductive, the circuit will continue to operate as in FIG. 1. To discontinue the supply of power to the load 12 it is only necessary to remove the signal from terminals 44 and 45 thereby discontinuing the operation of the transistor 40 and rendering it nonconductive. This operates to prevent the charging of capacitor 32 and eliminates the triggering source for the control electrode 18 of Triac 20.

Figure 4:
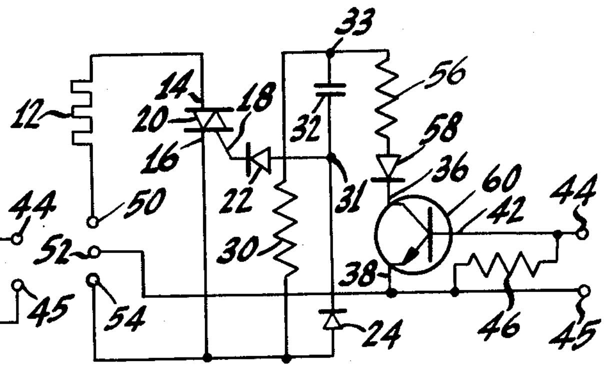

The embodiments of the present invention exhibited in FIGS. 4 and 5 have been adapted for use with a single-phase three terminal source of alternating current supply voltage having a neutral center terminal. Such circuits are advantageous because the load can be connected across the maximum voltage gradient of the source while the switching circuit need only be connected from the neutral terminal to one of the potential terminals. They find particular use where the load is a domestic space heater or cooking appliance which requires a 240 volt supply having the center neutral connected to a source of reference potential such as ground.

In FIG. 4 a single phase three terminal source (not shown) is connected between input terminals 50, 52, and 54 with the neutral center terminal connected to terminal 52. Input terminal 50 is connected to one terminal of a load 12. The second terminal of the load 12 is connected to the first terminal electrode 14 of a Triac 20. The second terminal electrode 16 of the Triac 20 is connected to input terminal 54. A first diode 22 and a second diode 24 are connected in series between the control electrode 18 of the Triac 20 and input terminal 54. Both diode 22 and diode 24 are poled to conduct conventional current toward the control electrode 18. A first resistor 30, a second resistor 56, a diode 58, and the collector 36 to emitter 38 path of an NPN transistor 60 are connected in series in the order named between input terminal 54 and the center terminal 52. The diode 58 is poled so as to conduct conventional current toward the collector 36 of the transistor 60. A capacitor 32 is connected between the junction 31 of diode 22 and diode 24, and the junction 33 of resistor 30 and resistor 56. The base 42 and emitter 38 terminals of the transistor 60 are brought out to terminals 44 and 45, respectively, and a resistor 46 is connected thereacross.

When, in the circuit of FIG. 4, there is no signal applied to terminals 44 and 45 the transistor 60 remains in a nonconductive state and thre is no completed circuit path through which the capacitor 32 can charge. Upon the application of a signal of appropriate magnitude and polarity to terminals 44 and 45, the transistor 60 is rendered conductive and a charging circuit is completed as follows: from input terminal 54 through the portion of the circuit including resistor 30 in parallel with the series combination of diode 24 and capacitor 32, through resistor 56, diode 58, the collector 36 to emitter 38 path of transistor 60, the center neutral terminal 52. When the potential at terminal 54 swings positive with respect to terminal 52, diodes 24 and 58 are switched into their conductive states and the capacitor 32 begins to charge. The value to which the capacitor 32 will charge is a function of the voltage divider action of resistors 30 and 56. At some point during this half cycle of the a.c. supply, i.e. when the potential at terminal 54 is positive with respect to terminal 52, the negatively charged plate on side 33 of capacitor 32 will become relatively negative with respect to terminal 52, and the positively charged plate on side 31 of capacitor 32 will become relatively positive with respect to terminal 54. When this occurs diodes 24 and 58 will switch into their nonconductive states and the capacitor 32 will begin to discharge through diode 22 which is now forward biased and in its conductive state. Once again, if the ratio of resistor 56 to resistor 30 is relatively high, the point at which the capacitor 32 will discharge will be very near the end of the charging half-cycle, i.e., the potential across terminals 52 and 54 will be approaching zero. It will continue to discharge through the control electrode 18 as the a.c. source polarity reverses, i.e. terminal 54 becomes negative with respect to terminal 52, and the discharge signal to the control electrode 18 will trigger the Triac 20 into a conductive condition causing it to conduct conventional current from terminal 50, through the load 12, the Triac 20, to the terminal 54. And again, if the value of capacitor 32 is properly selected, the duration of the discharge period can be made sufficiently long so that when the polarity of the a.c. source across terminals 50 and 54 changes again, i.e. terminal 54 becomes positive with respect to terminal 50, there is a sufficient discharge current remaining at the control electrode 18 to trigger the Triac into a conductive condition cuasing it to conduct conventional current from terminal 54, through the Triac 20, the load 12, and terminal 50. The operation of the circuit continues in similar fashion during successive cycles of the a.c. supply, the only difference being that successive charging of the capacitor 32 occurs while the Triac is already in a conductive state.

To discontinue operation of the circuit the transistor must be turned off by reducing the signal across terminals 44 and 45. This will prevent the capacitor 32 from taking any further charge.

In FIG. 5, the embodiment shown differs from FIG. 4 only in that diode 58, transistor 60 and resistor 46 have been replaced by a silicon controlled rectifier (SCR) 70.

The SCR 70 is switched into a conductive state when the voltage at its anode 72 is positive with respect to the voltage at its cathode 74, and a triggering pulse is applied to its control electrode 56 from a suitable source (not shown) connected across terminals 44 and 45. This difference aside, the operation of the circuit is identical to the operation of the circuit of FIG. 4, previously discussed.

In all of the foregoing embodiments of the present invention the Triac is always switched into its conductive states during the initial portions of successive alternating current half cycles when the absolute magnitude of the potential across the terminal electrodes is very small; i.e., just after the potential of the a.c. source across the input terminals has passed through zero. Similarly, the Triac is always switched into its nonconductive state during the terminal portions of successive alternating current half cycles when the absolute magnitude of the potential across the terminal electrodes is very small; i.e., just as the potential of the a.c. source across the input terminals is approaching zero. As a result thereof switching transients, and the interference associated therewith, are substantially avoided.

What is claimed is:

1. A switching circuit comprising:

a. a controlled bi-directional gate device having a first terminal electrode, a second terminal electrode, and a control electrode, said device becoming conductive in a first direction between said terminal electrodes when a signal of sufficient value and of a given polarity is applied to said control electrode and when a voltage above a first threshold value of insignificant magnitude and of one polarity is applied between said first and second terminal electrodes, said device becoming conductive in the opposite direction between said terminal electrodes when a signal of sufficient value and of a given polarity is applied to said control electrode and when a voltage above a threshold value of insignificant magnitude and of a polarity opposite to said one polarity is applied between said terminal electrodes;

b. means for connecting a load device and an alternating current source between said terminal electrodes;

c. a time constant circuit having a charge path of a first time constant including an energy storage device and having a discharge path of a second time constant including said energy storage device;

d. means for charging said storage device over said time constant circuit charge path whenever said alternating current source is of a given polarity, said storage device charging only when said alternating current source is of said given polarity; and e. means connected to the control electrode of said bi-directional gate device for discharging said storage device over said time constant circuit discharge path and through said control electrode, the discharge duration of said discharge path being sufficiently long to cause said gate device to become conductive in said first direction during the half cycle of alternating current of said given polarity and in said opposite direction during the opposite half cycle of said alternating current.

2. The invention as set forth in claim 1 wherein further means are provided selectively permitting and preventing charging of the time constant circuit, to turn said charging means on and off.

3. The invention as set forth in claim 2 wherein said further means comprises an active device which has controllable conducting and nonconducting states.

4. The invention as set forth in claim 1 wherein said charging means is further defined as comprising a semi-conductor diode poled to conduct only when said alternating current is of said given polarity.

5. The invention as set forth in claim 1 wherein said means connected to the control electrode of said bi-directional gate device is further defined as comprising a semiconductor diode.

6. A switching means comprising:

a. first and second input terminals between which a source of alternating current may be connected;

b. a load;

c. a controlled bi-directional gate device having a first terminal electrode, a second terminal electrode, and a control electrode, said device becoming conductive in a first direction between said terminal electrodes when a signal of sufficient value and of a given polarity is applied to said control electrode and when a voltage above a first threshold value of insignificant magnitude and of one polarity is applied across said first and second terminal electrodes, said device becoming conductive in the opposite direction between said terminal electrodes when a signal of sufficient value and of said given polarity is applied to said control electrode and when a voltage above a second threshold value of insignificant magnitude and of a polarity opposite to said one polarity is applied across said terminal electrodes;

d. a connection from said first input terminal through said load to said first terminal electrode of said gate device;

e. a connection from said second input terminal to said second terminal electrode of said gate device;

f. a time constant circuit having a charge path of a first time constant including an energy storage device and having a discharge path of a second time constant including said storage device;

g. means for charging said storage device over said time constant circuit charge path whenever said alternating current source is of a given polarity, said storage device charging only when said alternating current source is of said given polarity;

h. means connected to the control electrode of said bi-directional gate device and to said time constant circuit discharge path for discharging said storage device over said time constant circuit discharge path and through said control electrode, the discharge duration of said discharge path being sufficiently long to cause said gate device to become conductive in said first direction during the half cycle of alternating current of said given polarity and in said opposite direction during the opposite half cycle of said alternating current; and i. means connected to said time constant circuit charge path for controlling the level to which said energy storage device will charge.

7. The invention as set forth in claim 6 wherein the time constant circuit is charged from across said input terminals.

8. The invention as set forth in claim 6 wherein means are provided to prevent charging of said time constant circuit.

9. The invention as set forth in claim 6 wherein said charging means is further defined as comprising a semiconductor diode poled to conduct only when said alternating current is of said given polarity.

10. The invention as set forth in claim 6 wherein said means connected to the control electrode of said bidirectional gate device is further defined as comprising a semiconductor diode.

11. A power control circuit comprising:

a. a triac having first and second main terminal electrodes and a control electrode;

b. means for connecting a load and an alternating current source in circuit with said terminal electrodes;

c. a time constant circuit including a capacitive element and having a charge path of a first time constant and a discharge path of a second time constant;

d. means for charging said capacitive element over said time constant circuit charge path whenever said alternating current source is of a given polarity, said capacitive element charging only when said alternating current source is of said given polarity; and e. means for discharging said capacitive element through said time constant circuit discharge path and through said control electrode, the discharge duration of said discharging means being sufficiently long to trigger said triac into conduction in a first direction during the half cycle of alternating current of said given polarity and in the opposite direction during the opposite half cycle of said alternating current.

12. The invention as set forth in claim 11 wherein said charging means is further defined as comprising a semiconductor diode poled to conduct only when said alternating current is of said given polarity.

13. The invention as set forth in claim 11 wherein said discharging means is further defined as comprising a semiconductor diode.

* * * * *